June 21, 1927.

C. J. LAPP 1,633,335

MEANS AND APPARATUS FOR RECORDING SOUND WAVES

Filed Aug. 27, 1924

INVENTOR.

CLAUDE J. LAPP

BY HIS ATTORNEY

Herbert Grove Dorsey

Patented June 21, 1927.

1,633,335

UNITED STATES PATENT OFFICE.

CLAUDE JEROME LAPP, OF IOWA CITY, IOWA, ASSIGNOR TO HERBERT GROVE DORSEY, OF WASHINGTON, DISTRICT OF COLUMBIA.

MEANS AND APPARATUS FOR RECORDING SOUND WAVES.

Application filed August 27, 1924. Serial No. 734,494.

The present invention relates to a device by which sound waves or vibrations, corresponding to a range of sound of audible frequency, may be recorded or exhibited visually practically in undistorted form on account of the aperiodicity of the instrument.

A notable characteristic of instruments which are aperiodic is that their sensitiveness is partially lost, due to the endeavor to avoid a particular point of resonance at which the instrument is most sensitive.

In instruments of the present type, it has been the practice to try to obtain a diaphragm whose natural resonance frequency is well above the working range of the instrument, so that in the working range energy at all frequencies will be recorded with amplitudes proportionate to the energy no matter at what frequencies the energy is delivered. The result has been a decrease in distortion, but also such a notable decrease in sensitivity as to seriously affect their usefulness in certain lines of work. In instruments of this type in general, it is also true that the diaphragm and other parts which vibrate with the diaphragm have a considerable mass as compared with the vibrating parts of the present apparatus. This is due either to the thickness of the diaphragm to keep its resonance frequency above the audible range or to the natural construction which adds weight to the vibrating parts.

The present instrument is constructed of parts which are both light in weight and few in numbers. The mass as compared with other similar instruments is very small. The diaphragm is of material which has been found to be aperiodic. It may be seen therefore that the instrument itself tends to be aperiodic.

The object of the present invention is to obtain an instrument which will reproduce without distortion vibrations of the range of frequencies audible to the human ear.

Another object of the present invention is to provide an aperiodic vibrating system having very small inertia capable of responding to sounds of very weak intensity and all ordinary frequencies.

The present invention also aims to construct an apparatus which will be commercially useful and remain in a permanently operative condition under ordinary handling and use.

Other objects will be learned from the following description and drawing in which:—

Figure 1:
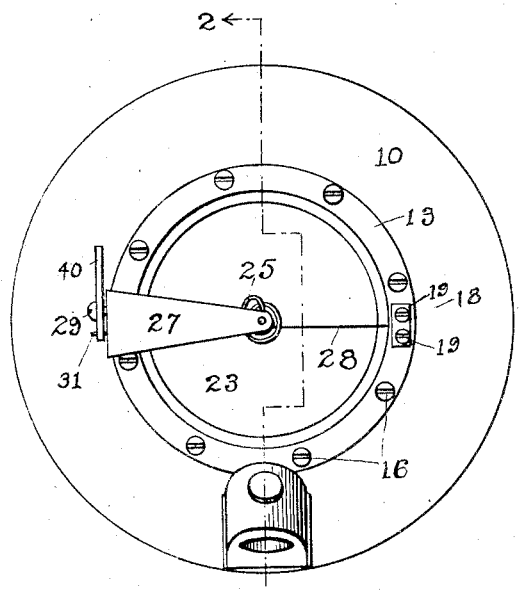
Figure 2:
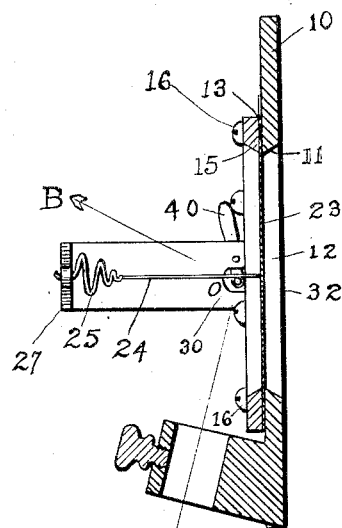
Figure 5:
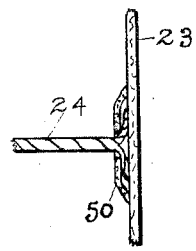
Figure 3:
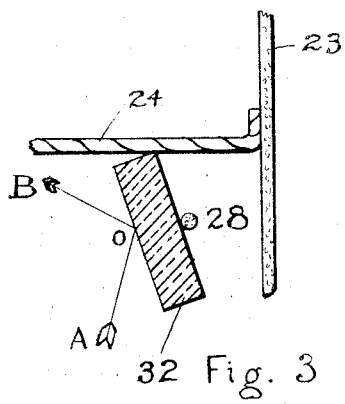
Figure 4:
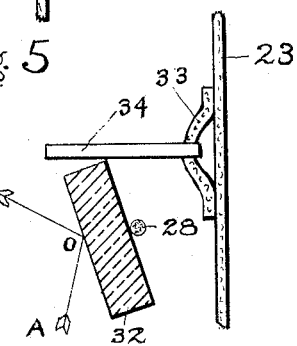

Figure 1 is a plan view of my improved device. Figure 2 is a section of Figure 1, on the line 2—2. Figure 3 shows in an enlarged form details of the mirror suspension. Figure 4 is a section of a modified form of my invention. Figure 5 is a section of a modified form of attaching the thread to the diaphragm.

A thin rigid plate 10, has a circular opening at its middle which has a bevelled edge 11 on which is clamped the annular ring 13 by means of the screws 16. The ring 13 is provided with a bevelled edge, 15, this edge being of such a diameter that when the ring is clamped to the plate 10, the two inner edges of 15 and of 11 coincide with each other.

Before these two surfaces are clamped together a thin diaphragm 23 composed of a material which is at the same time light, tough and permanent in character, such as gold beater's skin or a thin waxed paper called dermatype is stretched over the opening 12 and the ring is then clamped to the plate so as to hold the diaphragm securely in place. In order that the diaphragm may retain a permanently stretched condition and be unaffected by changes in humidity it is preferable to stretch the diaphragm while wet and after it has dried to coat it with a thin solution of some substance like rubber cement rendering it impervious to moisture.

The diaphragm is open and not enclosing or forming a part of resonant chambers which might give it a definite resonant characteristic.

At the center of the diaphragm 23 (see Figure 3) is cemented one end of a thread 24, the other end of which is attached to the small end of a conical spring 25, (Figure 4) made of very small steel or phosphor bronze wire, whose large end is attached to the arm 27 which may be either attached as a separate piece to the plate 10 or may be an integral part of the ring 13 as shown in the drawing.

Slightly behind the diaphragm, parallel to it, and to a diameter of the ring 13, a thread 28 is tightly stretched and clamped at one end by clamp 18 and the screws 19, or it may be held by cement or by other means. The other end 31, is fastened permanently to the short arm of a lever 40, pivoted by a screw 29 so that it may rotate a slight amount about the axis, of screw 29. The thread 28 is in a permanetly stretched condition. A small mirror is held pivoted at the middle of its back surface to the thread 28 by shellac or other suitable means, and is also attached at one edge to the thread 24 by similar means. When the lever 40 is moved it will move the clamped end 31, and the relative motion of the threads 28 and 24 will cause the mirror 32 to change its normal angle with reference to the thread 24.

In the modified form of my invention shown on Figure 4, the diaphragm 23 is reinforced at its center by a disc 33 to the center of which is rigidly fastened a rigid member 34 which may be a small wire or bristle. The thread 28 is stretched parallel to the diaphragm as in the previous case and the mirror 32 has its middle attached to the thread 28, and an edge is attached at one point to the member 34, similarly as in Figure 3.

A further modification of attaching the thread 24 to the diaphragm 23 is shown in Figure 5. Here the thread 24 is made fast to the diaphragm 23 by shellac or other suitable material and a disc of paper 50 or some material similar to that used in the diaphragm, is used to reinforce the joint. This disc has a hole through which the thread 24 passes and as shown in Figure 5, the thread may be spread so that a greater surface may adhere to the diaphragm.

The operation of the instrument may be described briefly, as follows. When a sound wave strikes the back side of the diaphragm 23, the pressure on the diaphragm causes it to move to the left in Figure 2. The spring 25 exerting a tension on the thread 24 will be slightly relieved resulting in a slight movement of the thread 24 to the left longitudinally along its own axis. As shown in Figure 3 the thread 24 will also move to the left and draw the edge of the mirror 32 along with it. Since the mirror 32 is pivoted to the thread 28, the mirror will rotate through an angle. A beam of light AOB reflected from the mirror as shown by the arrow will be reflected through twice the angle, through which the mirror 32 has been rotated according to the well known laws of reflection. When the rarefaction of the compressional wave arrives the diaphragm 23 will move to the right in Figure 2, and rotation of the mirror will take place in the opposite direction.

The reproduction of the sound wave may be shown visually upon a screen or photographed. A constant source of light A is used in connection with the mirror 32 and reflected from the mirror in the line OB upon a rotating mirror or other suitable means, not shown, to reproduce graphically the sound wave. The action of the diaphragm in moving back and forth, causes the mirror to vibrate, corresponding exactly to the movement of the diaphragm.

The lever 40 allows the mirror to be adjusted to reflect the beam OB in the desired direction. This is very desirable where the beam of light is desired to be reflected upon a certain spot.

As shown in Figures 3 and 4, the dimensions of the threads and mirror, are greatly magnified. The mirror is of the size of an oscillograph mirror or smaller and the threads, a few strands of silk or some similar material.

The lightness of this combination is a big factor in obtaining an aperiodic instrument, and also one of great sensitivity. The aperiodicity of the instrument is also aided by the use of a spiral spring, which due to the varying diameter has no pronounced frequency.

Having now described my invention, I claim:—

1. An apparatus for the reception of vibratory motion comprising a stretched paper diaphragm, a thread firmly mounted parallel to the diaphragm and above the middle thereof, a second thread attached to the center of the diaphragm and mounted perpendicular thereto, a support, a conical spring held at one end by said support, and the other end tensioning said perpendicularly mounted thread, a mirror pivoted on said first thread and secured at an edge to the second thread whereby motion of the diaphragm will rotate the mirror.

2. An apparatus for the reception of vibratory motion comprising a diaphragm, a reflecting mirror pivoted on a thread stretched parallel to a diameter of the diaphragm, and behind it a second thread stuck to the center of the diaphragm and perpendicular to it, said thread supported in position by a spring, said thread stuck to an edge of said reflecting mirror whereby motion of the diaphragm will cause corresponding motion of the mirror.

3. An apparatus for the reception of vibratory motion comprising an open paper diaphragm, reflecting means pivoted behind said diaphragm, an aperiodic conical spring, a thread tensioned by said spring at one end and stuck to the center of the diaphragm at the other end, said thread also stuck to said reflecting means, whereby vibrations of the diaphragm will cause oscillations of the reflecting means.

4. An apparatus for the reception of vibratory motion comprising a diaphragm, reflecting means adjustably pivoted behind said diaphragm, an aperiodic spring, a thread tensioned by said spring at one end and attached to the center of the diaphragm at the other end, said thread also attached to said reflecting means whereby vibrations of the diaphragm will cause oscillations of the reflecting means.

In testimony whereof I affix my signature.

CLAUDE JEROME LAPP.